United States Patent
Yamamoto et al.

(10) Patent No.: US 7,362,069 B2
(45) Date of Patent: Apr. 22, 2008

(54) VOLTAGE SOURCE INVERTER CONTROL METHOD

(75) Inventors: Yoichi Yamamoto, Fukuoka (JP);
Masashiro Tanaka, Fukuoka (JP);
Shigekazu Nakamura, Fukuoka (JP);
Hiroshi Suetake, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 254 days.

(21) Appl. No.: 10/568,709

(22) PCT Filed: Jul. 30, 2004

(86) PCT No.: PCT/JP2004/010962

§ 371 (c)(1),
(2), (4) Date: Feb. 17, 2006

(87) PCT Pub. No.: WO2005/018080

PCT Pub. Date: Feb. 24, 2005

(65) Prior Publication Data
US 2007/0030705 A1    Feb. 8, 2007

(30) Foreign Application Priority Data
Aug. 18, 2003  (JP) ............................... 2003-294412

(51) Int. Cl.
*G05B 11/28* (2006.01)

(52) U.S. Cl. ...................... 318/599; 318/811; 318/798; 318/805

(58) Field of Classification Search ................ 318/599, 318/811, 432, 434, 569, 600, 798, 805, 632
See application file for complete search history.

(56) References Cited

U.S. PATENT DOCUMENTS

| 4,680,526 A | 7/1987 | Okuyama et al. |
| 5,872,710 A * | 2/1999 | Kameyama ................... 363/95 |
| 6,940,189 B2 * | 9/2005 | Gizara ......................... 307/151 |
| 2002/0186491 A1 * | 12/2002 | Hill .............................. 360/67 |

FOREIGN PATENT DOCUMENTS

| JP | 61-231889 A | 10/1986 |
| JP | 8-19269 A | 1/1996 |
| JP | 2000092852 A | 3/2000 |
| WO | WO 98/42067 A1 | 9/1998 |

* cited by examiner

*Primary Examiner*—Rina Duda
(74) *Attorney, Agent, or Firm*—Sughrue Mion, PLLC (57) ABSTRACT

A simple and accurate dead time dispersion measurement method and a voltage source inverter control method that can prevent the occurrence of an unstable phenomenon are provided.

The control method controls a voltage source inverter of a PWM system, which includes a power semiconductor device controlling a level of a voltage, a frequency and a phase. According to the control method, before operation, voltage error information for each polarity of respective phase currents of the inverter is stored. And during the operation, the voltage error information is read to compensate for a voltage instruction value or a pulse width of a PWM instruction signal, so that a voltage error can be corrected.

5 Claims, 5 Drawing Sheets

VOLTAGE SOURCE INVERTER CONTROL METHOD

BACKGROUND OF THE INVENTION

1. Field of the Invention

The present invention relates to a control method of an AC motor for preventing torque reduction and torque ripple, and an unstable phenomenon in a voltage source inverter of a PWM system.

2. Description of the Related Art

In a voltage source inverter of a PWM system, a P side switching device and an N side switching device constituting the inverter are alternately rendered conductive to control an output voltage. However, since due to the turn-off time a delay occurs in the switching of the switching devices, only one of the switching devices is turned on when a predetermined period (a dead time) has elapsed following the switching off of the other switching device, and the P side and the N side switching devices are not turned on at the same time.

In the related voltage source inverter of the PWM system, especially in a case wherein the output frequency of the inverter is low, simply because the output voltage is low, extensive fluctuation and distortion of the output voltage occurs because of the dispersion of the dead time. Thus, as problems, the torque of a motor controlled by the inverter is reduced, and torque ripple and an unstable motor phenomenon occur.

A known conventional adjustment method is the one described in patent document 1, whereby a shift in a dead time (an on-delay) compensation value is automatically adjusted.

Patent Document 1: International Patent Publication WO98/42067(PCT/JP97/00909)

SUMMARY OF THE INVENTION

Means for Solving the Problems

However, a method for automatically adjusting a difference between the dead time compensation values of P side and N side switching devices, which together constitute an inverter, is not disclosed in the related example provided in patent document 1. Therefore, when there is a dead time difference between the P side and N side switching devices, a satisfactory correction can not be performed, and to perform an adjustment, the motor must be driven by supplying two or more different switching frequencies (carrier frequencies).

The present invention is provided while taking these problems into account. An object of the present invention is to provide a simple and accurate measurement method whereby a dead time difference between a P side and an N side can be measured, without a carrier frequency change being required, and a control method of the voltage source inverter, which can prevent the occurrence of an unstable phenomenon, due to the distortion of an inverter output voltage, and of torque ripple, which are the result of the dispersion of the dead time.

Means for Solving the Problems

To solve the above problems, the present invention is characterized by the employment of the following control method.

(First invention) The invention provides a control method of a voltage source inverter of a PWM system, which includes a power semiconductor device controlling a level of a voltage, a frequency and a phase.

The control method includes the steps of:

before operation, storing voltage error information for each polarity of respective phase currents of the inverter; and during the operation, reading the voltage error information to compensate for a voltage instruction value or a pulse width of a PWM instruction signal, in order to correct a voltage error.

(Second invention) The control method further includes the steps of:

before the operation, providing an AC motor with a current voltage instruction to drive the AC motor in a phase where current values of two phases of the power semiconductor device constituting the voltage source inverter are equal and where a current value of the other one phase is 0;

modifying a voltage correction value so that the current values of the two phases are equal or the current value of one phase is 0; and calculating the voltage error information used during the operation based on the modified voltage correction value, to store the voltage error information.

(Third invention) The control method further includes the steps of:

before the operation, providing an AC motor with a current voltage instruction to drive the AC motor in a phase where current values of two phases of the power semiconductor device constituting the voltage source inverter are equal and where a current value of the other one phase is a total of the current values of the two phases;

modifying a voltage correction value so that the current values of the two phases are equal or two times a current in the other phase flows in one phase; and calculating the voltage error information used during the operation based on the modified voltage correction value, to store the voltage error information.

(Fourth invention) The control method further includes the steps of:

before the operation, providing an AC motor with a current voltage instruction to drive the AC motor in a phase where currents in respective phases of the power semiconductor device constituting the voltage source inverter fall under a predetermined condition;

modifying a voltage correction value so that current values fall under the predetermined condition; and calculating the voltage error information used during the operation based on the modified voltage correction value, to store the voltage error information.

(Fifth invention) In the control method, any one of the conditions and methods according to the second invention to the fourth invention is performed multiple times in different phases, and the voltage error information used during the operation is calculated and stored.

While the dead time is not measured, respective phases and a dead time difference between the P side and the N side can be measured and corrected. Therefore, the dispersion of a switching delay due to the turn-off time of the switching devices that constitute the inverter can be eliminated, and since a change in a carrier frequency is not required, the period required for the adjustment can be reduced.

Advantage of the Invention

According to the present invention, since the dispersion value for the dead time can be easily and accurately calculated, an unstable phenomenon, which occurs due to waveform distortion and torque ripple that are caused by the dispersion of the dead time, can be prevented, and stable control can be provided.

DESCRIPTION OF THE REFERENCE NUMERALS AND SIGNS

1: Voltage source inverter
2: AC motor
3U, 3V, 3W: Current detector
4U, 4V, 4W: Comparator
5: Oscillator
6U, 6V, 6W: Adder
7: Gate circuit
8: Inverter controller
9U, 9V, 9W: Dead time compensator
10: DC power source
11: Speed instruction circuit
12: Exciting current instruction circuit
13A to 13F: Switch circuit
14: Speed detector
15: 3-phase/2-phase converter
16: 2-phase/3-phase converter
17: Primary angular frequency operating circuit
18: Speed control circuit
19: Torque current control circuit
20: Exciting current control circuit
21: Voltage instruction compensation circuit
22A, 22B: Adder
23: Multiplier
24: Dispersion tuning processor

DETAILED DESCRIPTION OF THE PREFERRED EMBODIMENTS

The embodiments of the present invention will now be described while referring to the drawings.

Embodiment 1

Figure 1:
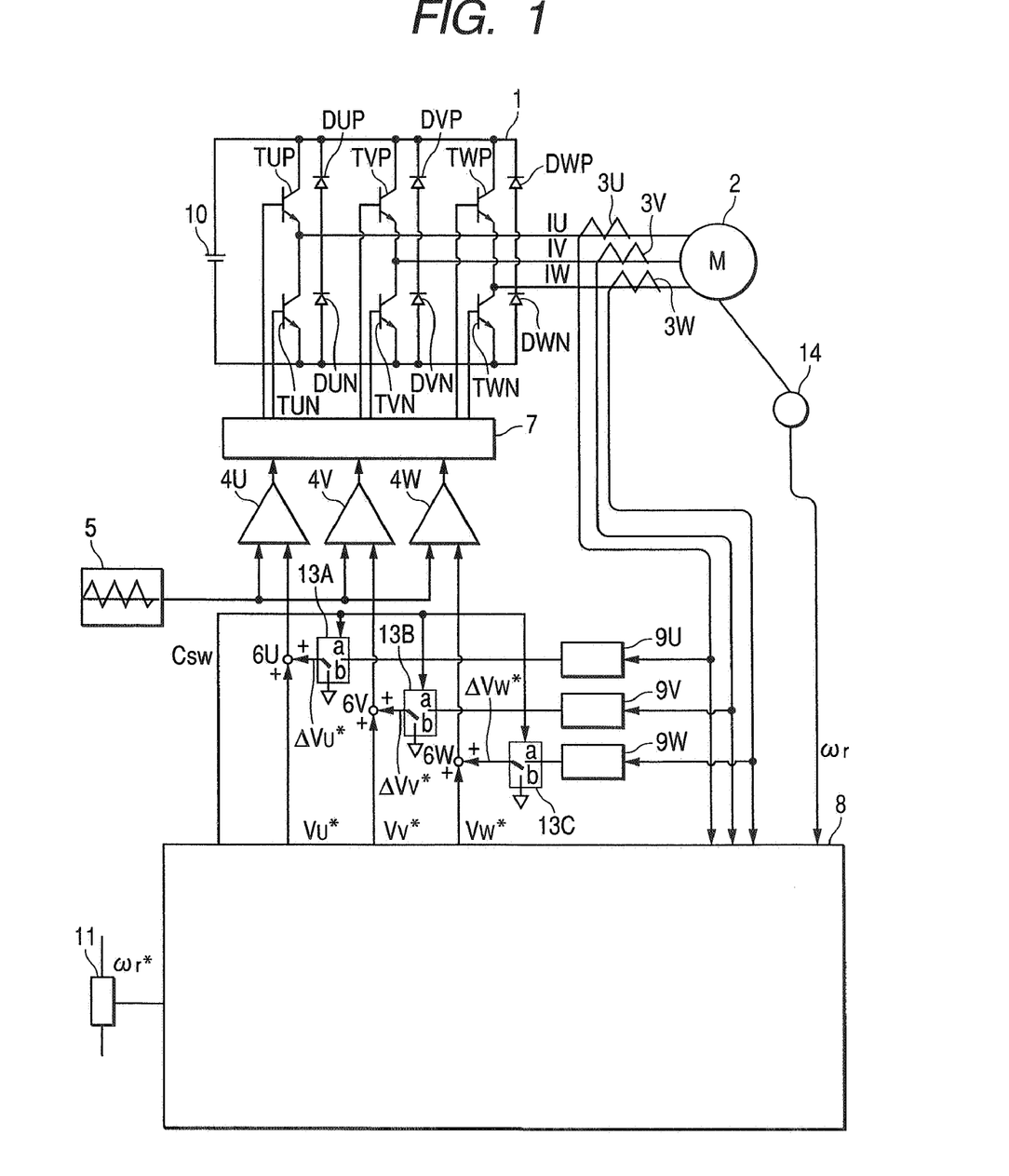
FIG. 1 is a diagram showing the circuit configuration of a voltage source inverter according to a first embodiment of the present invention.

A first embodiment of the present invention is shown in FIG. 1. In FIG. 1, reference numeral 1 denotes a voltage source inverter; 2, an AC motor; 3U, 3V, 3W, current detectors; 4U, 4V, 4W, comparators; 5, an oscillator for oscillating a carrier signal; 6U, 6V, 6W, adders; 7, a gate drive circuit; 8, an inverter controller; 9U, 9V, 9W, dead time compensators; 10, a DC power source; 11, a speed instruction circuit; and 13A, 13B, 13C, switch circuits. The voltage source inverter 1 employs a PWM control method to convert a DC voltage, received from the DC power source 10, to an AC voltage having an arbitrary frequency. The voltage source inverter 1 includes: switching devices TUP, TVP, TWP, TUN, TVN, TWN, which are formed of transistors and power semiconductor devices such as IGBT; and feedback diodes DUP, DVP, DWP, DUN, DVN, DWN, which are connected in an antiparallel manner to the individual power semiconductor devices. The AC motor 2 is connected to the AC output terminals of the respective phases U, V, W of the voltage source inverter 1. Phase currents Iu, Iv, Iw of U phase, V phase and W phase of the AC motor 2 are detected by the current detectors 3U, 3V, 3W. It should be noted that a speed detector 14 is connected to the AC motor 2.

Figure 5:
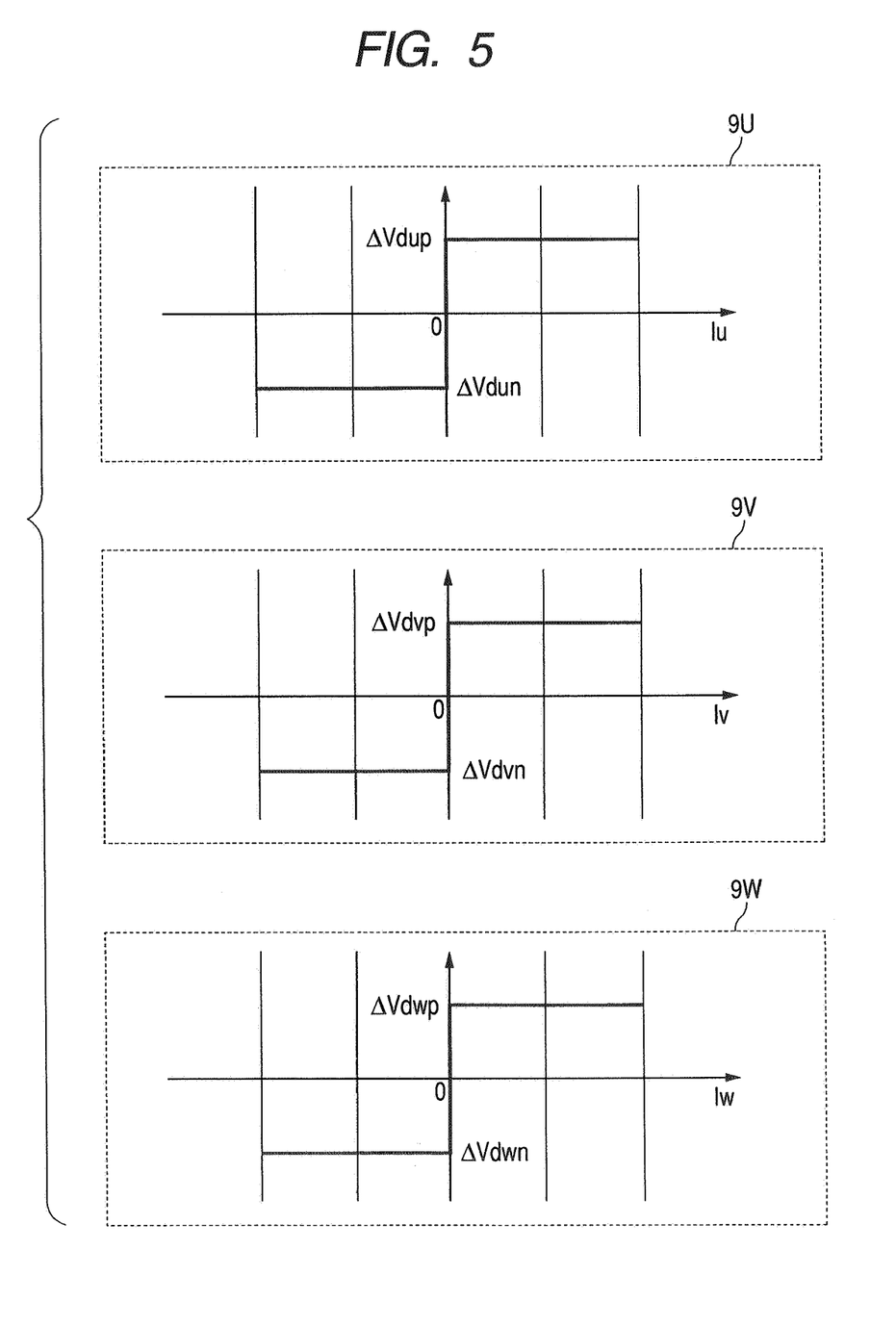
FIG. 5 is an explanatory diagram showing dead time compensators (9U, 9V, 9W) according to the present invention.

A speed instruction value ωr* generated by the speed instruction circuit 11, the phase currents Iu, Iv, Iw of the U phase, the V phase and the W phase of the AC motor 2, which are detected by the current detectors 3U, 3V, 3W, and a speed detection value ωr obtained by the speed detector 14 are transmitted to the inverter controller 8. And, as will be described later, voltage instruction pattern signals (Vu*, Vv*, Vw*) for the respective phases U, V, W are output with a phase difference of 120°. Here, subscript * indicates a instruction value (this is applied hereinafter). The switch circuits 13A, 13B, 13C output 0 when dispersion of the dead time is measured before operation, and during operation, output values received from the dead time compensators 9U, 9V, 9W. FIG. 5 is an explanatory diagram for the dead time compensators 9U, 9V, 9W. As shown in FIG. 5, as the output for the dead time compensator 9U, an individual value of ΔVdup or ΔVdun can be set in accordance with the polarity of Iu; as the output of the dead time compensator 9V, an individual value of. ΔVdvp or ΔVdvn can be set in accordance with the polarity of Iv; and as the output of the dead time compensator 9W, an individual value of ΔVdwp or ΔVdwn can be set in accordance with the polarity of Iw.

Furthermore, voltage instruction pattern signals (Vu*, Vv*, Vw*) for the respective phases are transmitted to the adders 6U, 6V, 6W with a phase difference of 120°. The adders 6U, 6V, 6W add the voltage instruction pattern signals Vu*, Vv*, Vw* to the output values of the switch circuits 13A, 13B, 13C and transmit the voltage instruction values Vu*, Vv*, Vw* to the comparators 4U, 4V, 4W, respectively. A signal (hereinafter the frequency of this signal is called a carrier frequency) output by the oscillator 5, which generates a carrier signal to perform PWM control, is transmitted to the comparators 4U, 4B, 4W. The comparators 4U, 4V, 4W compare the signals output by the adders 6U, 6V, 6W with the carrier signal, and generate PWM pulses in order to turn on or off the switching devices TUP, TVP, TWP, TUN, TVN, TWN that constitute the voltage source inverter 1. The gate circuit 7 provides a gate signal for the switching devices TUP, TVP, TWP, TUN, TVN, TWN in accordance with the PWM pulses output by the comparators 4U, 4V, 4W.

Figure 2:
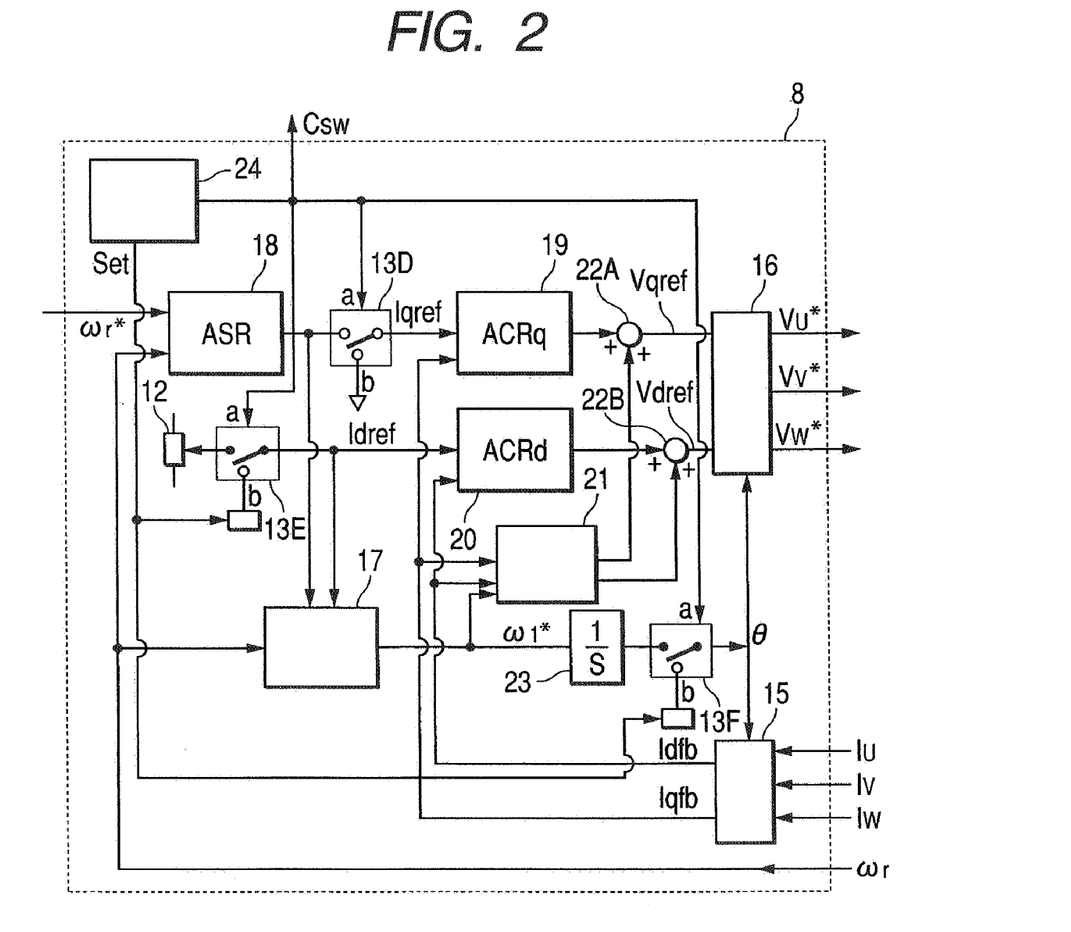
FIG. 2 is a detailed circuit diagram showing a controller 8, a constituent of the first embodiment of the present invention.

FIG. 2 is a detailed circuit showing the inverter controller 8 previously described. In FIG. 2, reference numeral 12 denotes an exciting current instruction circuit; 13D, 13E, 13F, switch circuits; 15, a 3-phase/2-phase converter; 16, a 2-phase/3-phase converter; 17, a primary angular frequency operation circuit; 18, a speed control circuit; 19, a torque current control circuit; 20, an exciting current control circuit; 21, a voltage instruction compensation circuit; 22A, 22B adders; 23, a multiplier; and 24, a dispersion tuning processor. The inverter controller 8 includes the 3-phase/2-phase converter 15, for outputting a torque feedback value Iqfb and an exciting current feedback value Idfb that are obtained by coordinate conversion of the phase currents (the U phase current Iu, the V-phase current Iv, the W phase current Iw) of the AC motor 2. Further, the torque current control circuit (ACRq) 19 is also provided, which defines, as a torque current instruction value Iqref, the output value of the speed control circuit (ASR) 18 that is provided in order to coincide the speed instruction value ωr* received from the speed instruction circuit 11, with the speed detection value ωr obtained by the detector 14, and which controls the Iqref and the torque current feedback value Iqfb output by the 3-phase/2-phase converter 15 to coincide them; and the exciting current control circuit (ACRd) 20, which controls a voltage in the exciting current direction, so that the exciting current instruction value Idref of the exciting current instruction circuit 12 matches the exciting current feedback value Idfb of the 3-phase/2-phase converter 15.

In addition, the inverter controller 8 includes: the voltage instruction compensation circuit 21, which outputs an induced voltage generated by the AC motor 2 and a counterelectromotive force voltage generated by a primary resistance r1 and a leakage inductance. Of the outputs of the voltage instruction compensation circuit 21, the voltage of a torque current directional component is added to the output of the torque current control circuit 19 by the adder 22A, and a torque-current-directional voltage instruction value Vqref is generated. The voltage of an exciting current directional component is added to the output of the exciting current control circuit 20 by the adder 22B, and an exciting-current-directional voltage instruction value Vdref is generated. The 2-phase/3-phase converter 16 is also provided, which employs the torque-current-directional voltage instruction value Vqref and the exciting-current-directional voltage instruction value Vdref to generate voltage instruction pattern signals (Vu*, Vv*, Vw*) for the respective U, V, W phases having a phase difference of 120°, and to output these pattern signals.

It should be noted that the 3-phase/2-phase converter 15 and the 2-phase/3-phase converter 16 are operated by expression 1 and expression 2, respectively.

[Expression 1]

$$\begin{bmatrix} Idfb \\ Iqfb \end{bmatrix} = \begin{bmatrix} \cos\theta & \sin\theta \\ -\sin\theta & \cos\theta \end{bmatrix} \begin{bmatrix} 1 & 0 & 0 \\ 0 & 1/\sqrt{3} & -1/\sqrt{3} \end{bmatrix} \begin{bmatrix} Iw \\ Iu \\ Iv \end{bmatrix} \quad (1)$$

$$\begin{bmatrix} Vw^* \\ Vu^* \\ Vv^* \end{bmatrix} = \begin{bmatrix} 1 & 0 \\ -1/2 & \sqrt{3}/2 \\ -1/2 & -\sqrt{3}/2 \end{bmatrix} \begin{bmatrix} \cos\theta & -\sin\theta \\ \sin\theta & \cos\theta \end{bmatrix} \begin{bmatrix} Vdref \\ Vqref \end{bmatrix} \quad (2)$$

Further, the inverter controller 8 also includes the primary angular frequency operation circuit 17, which calculates a slip frequency instruction value ωs* based on Idref and Iqref and a secondary resistance r2 that is designated, and employs this instruction value and the speed detection value ωr, obtained by the speed detector 14, to calculate the primary angular frequency $\omega_1^*$, and outputs the primary angular frequency $\omega_1^*$. The primary angular frequency $\omega_1^*$ output by the primary angular frequency instruction operation circuit 17 is multiplied by the multiplier 23, and the result is output as a phase θ to the 3-phase/2-phase converter 15 and the 2-phase/3-phase converter 16.

It should be noted that the inverter controller 8 includes the dispersion tuning processor 24 that controls the dead time dispersion measurement operation before the operation is started. The dispersion tuning processor 24 outputs a switching signal Csw for switching the switch circuits 13A to 13F, and designates (Set), of the exciting current instruction value Idref, and the phase θ for the measurement of the dead time dispersion before the operation starts.

In addition, at the time of the measurement of the dead time dispersion before the operation starts, the inverter controller 8 changes, through the switch circuit 13D, the torque current instruction value to 0, and changes, through the switch circuits 13E, 13F, the exciting current instruction value Idref and the phase θ to instruction values as received from the dispersion turning processor 24.

As described above, during the operation, the output of the dead time compensator 9U is ΔVdup or ΔVdun, in accordance with the polarity of Iu, the output of the dead time compensator 9V is ΔVdvp or ΔVdvn, in accordance with the polarity of Iv, and the output of the dead time compensator 9W is ΔVdwp or ΔVdwn, in accordance with the polarity of Iw. Therefore, a voltage error can be corrected for each polarity of a phase current.

Figure 3:
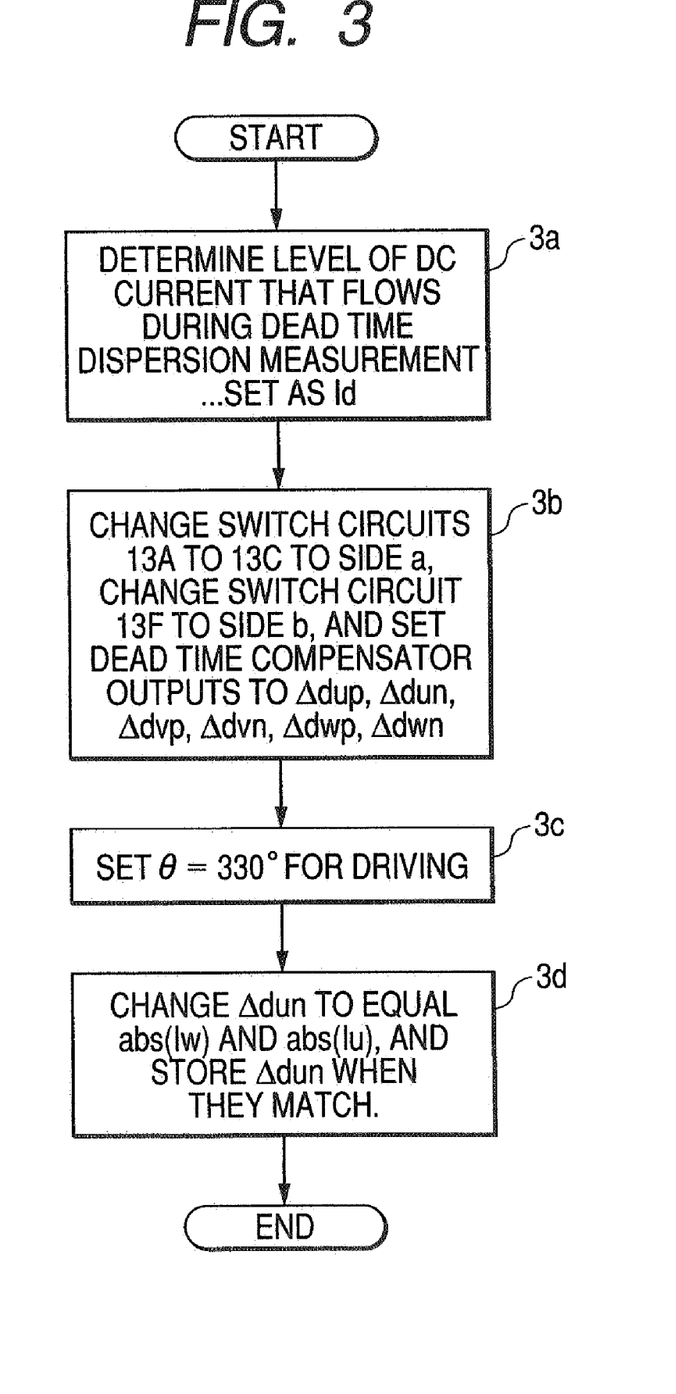
FIG. 3 is a flowchart showing the contents of the operation performed for the first embodiment of the present invention.

While referring to the flowchart in FIG. 3, the dispersion measurement processing performed before an operation will now be described in detail, by employing mainly the operation of the dispersion tuning processor 24.

An operation is performed while a voltage correction value is varied in such phases that the current detection value of one of the U phase, the V phase and the W phase is 0, and when the current detection values of the other two phases match, or when the current of one phase becomes 0, a difference in the voltage correction value is stored as a dispersion value (a relative value) between the two phases. Under this condition, measurement of the dispersion value between the P side and the N side is performed.

Referring to the circuit configuration diagram in FIG. 1 for the voltage source inverter, the current detectors 3U, 3V, 3W are provided for the respective phases. However, actually, since current detectors may be provided only for two phases (the W phase and the U phase in this case) to reduce the costs, an explanation will be given for this case.

In the dispersion measurement processing performed before the operation starts, the dispersion tuning processor 24 employs the rated current values of the voltage source inverter 1 and the AC motor 2 to determine whether the level of a DC current to be supplied during dispersion measurement is Id (block 3a). The switch circuits 13A to 13C are provided on the a side, while the switch circuit 13F is provided on the b side, and the outputs of the dead time compensators 9U, 9V, 9W are to be added to voltage instruction values of the respective phases. It should be noted that compensation values used for the measurement are Δdup, Δdun, Δdvp, Δdvn, Δdwp, Δdwn, and that the initial values are equal. Further a carrier frequency is set as high as possible within the permissible range of the inverter, so that the affect of the dead time is increased (block 3b).

Sequentially, when the phase θ is set to 330° and the operation is performed, the voltage instruction values of the respective phases are Vw*=−Vu*, Vv*=0 (block 3c). Δdun is adjusted so as to equal the current detection values Iw, −Iu of the W, U phases. In this correction operation, when abs(Iw)>abs(Iu), Δdun is increased, or when abs(Iw)<abs(Iu), Δdun is decreased, and a difference value for the dead time between the W phase P side and the U phase N side is stored in Δdun (block 3d). It should be noted that abs(X) indicates the absolute value of X.

In the above description, Δdun is varied in accordance with the levels of abs(Iw), abs(Iu). However, Δdun may be changed so that Iv=0, i.e., Iu+Iw=0.

Embodiment 2

A second embodiment will now be described. According to the second embodiment, an operation is performed while a voltage correction value is varied in such phases that the current detection values of two of a U phase, W phase and W phase are equal, and when the current detection values of the two phases match, or when two times the current of the other phase is supplied to one phase, a difference value for the voltage correction value is stored as a dispersion value (relative value) between the two phases. Under this condition, measurement of the dispersion value between phases on the same side, P or N, is performed.

Figure 4:
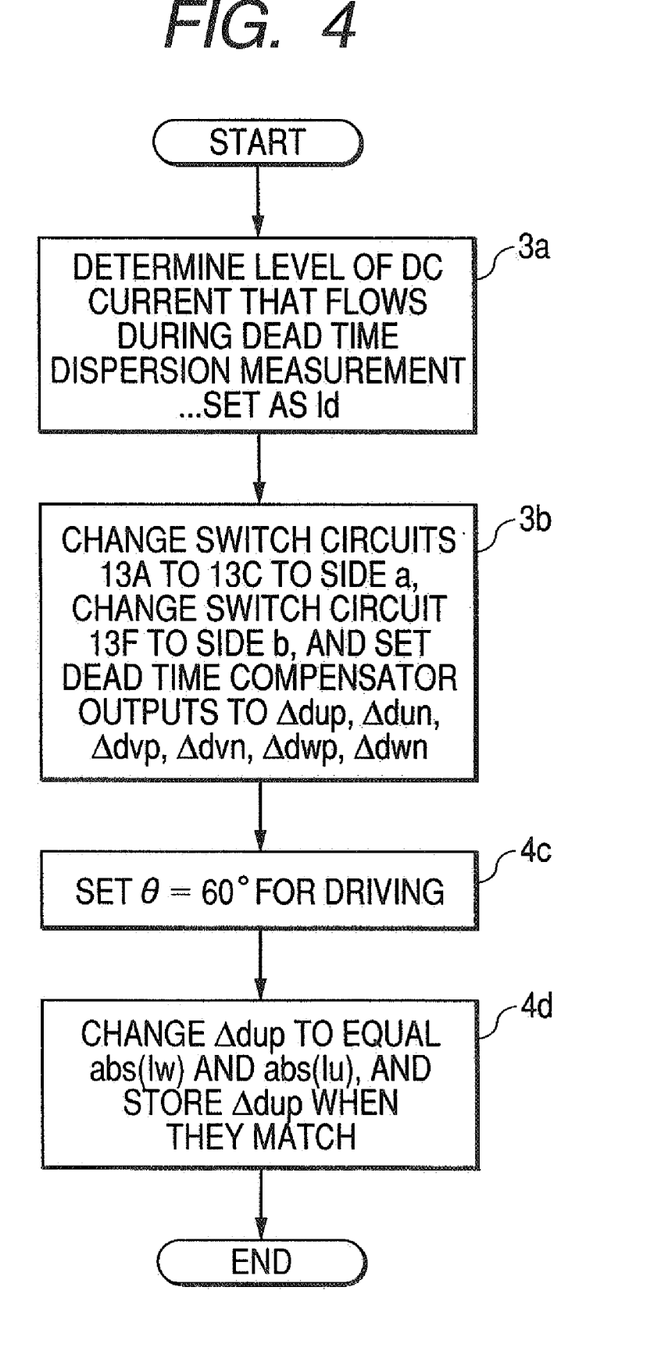
FIG. 4 is a flowchart showing the contents of the operation performed for a second embodiment of the present invention.

Since the difference in the second embodiment from the first embodiment is only the provision of the phase θ and an adjustment method, these portions will be explained while referring to the flowchart in FIG. 4.

In the dispersion measurement processing performed before the operation starts, the dispersion tuning processor 24 performs (block 3a) and (block 3b).

Sequentially, when the phase θ is set to 60° and the operation is performed, the voltage instruction values of the respective phases are Vw*=Vu*=Vv*/2 (block 4c). Δdup is adjusted so as to equal the current detection values Iw, Iu of the W, U phases. In this correction operation, when abs(Iw)>abs(Iu), Δdup is increased, or when abs(Iw)<abs(Iu), Δdup is decreased, a difference value for the dead time between the W phase P side and the U phase N side is stored in Δdup (block 4d).

Furthermore, for another arbitrary phase θ differing from the above phase, current values for the respective phases that flow during the phase θ can be identified. Thus, the difference value for the dead time need only be adjusted to obtain the current values, so that dead band compensation can also be performed.

In addition, before the operation starts, when one of the conditions or methods described above is repeated multiple types in different phases, dispersion values for the U phase, V phase, W phase and dispersion values for the dead time for the P side, the N side of the respective phases can be measured.

The voltage correction values (dispersion value) Δdup, Δdun, Δdvp, Δdvn, Δdwp, Δdwn, for the dead time for respective phases, and the P, N sides obtained by the above described measurement, are converted, using simple simultaneous equations (calculations), into setup values ΔVdup, ΔVdun, ΔVdvp, ΔVdvn, ΔVdwp, ΔVdwn (voltage error information), provided for the dead time compensators 9U, 9V, 9W that are employed for the operation.

According to this embodiment, the voltage error information provided by the thus measured dead time is set at locations corresponding to the dead time compensators 9U, 9V, 9W, and the switch circuits 13A to 13F are changed to the a side during the operation. As a result, dead time compensation can be performed by employing voltage error information provided by individual dead times.

In the above description, the voltage correction values (dispersion values) are stored as voltage error information to be added to the voltage instruction values. However, in the case of an inverter wherein the pulse width of a PWM signal is employed as compensation for the dead time, a voltage compensation value (a dispersion value) need only be converted into voltage error information employing the pulse width of a PWM signal, and this pulse width may be stored.

Furthermore, in the above explanation, the current detectors have been provided only for the W phase and the U phase. However, the processing can be performed in the same manner when the current detector is provided for another phase, or for three phases.

Further, the phase θ has been changed to vary a voltage value to be provided for the respective phases. However, the phase θ may be fixed, and the voltage instruction values Vu*, Vv*, Vw* used in the dispersion measurement processing may be changed, or the current instruction values Idref, Iqref may be modified. The processing can be performed in the same manner.

The embodiments of the present invention have been explained by employing an induced motor with a speed detector. However, the present invention can be applied for an induced motor without a speed detector, or a synchronous machine. It is obvious that the effects of the present invention can also be obtained.

In addition, it is needless to say that the voltage error measurement method using the dead time, disclosed for the embodiments of the present invention, can be employed without any problem, even when a different dead time compensation method is employed during operation.

INDUSTRIAL APPLICABILITY

When the present invention is employed, it is possible to prevent torque reduction, torque ripple and the occurrence of an unstable phenomenon for a motor that is driven by a voltage source inverter of a PWM system.

What is claimed is:

1. A control method of a voltage source inverter of a PWM system, which includes a power semiconductor device controlling a level of a voltage, a frequency and a phased, the control method comprises the steps of:
   before operation, storing voltage error information for each polarity of respective phase currents of the inverter; and
   during the operation, reading the voltage error information to compensate for a voltage instruction value or a pulse width of a PWM instruction signal, in order to correct a voltage error.

2. The control method according to claim 1, further comprising the steps of:
   before the operation,
   providing an AC motor with a current voltage instruction to drive the AC motor in a phase where current values of two phases of the power semiconductor device constituting the voltage source inverter are equal and where a current value of the other one phase is 0;
   modifying a voltage correction value so that the current values of the two phases are equal or the current value of one phase is 0; and
   calculating the voltage error information used during the operation based on the modified voltage correction value, to store the voltage error information.

3. The control method according to claim 1, further comprising the steps:
   before the operation,
   providing an AC motor with a current voltage instruction to drive the AC motor in a phase where current values of two phases of the power semiconductor device constituting the voltage source inverter are equal and where a current value of the other one phase is a total of the current values of the two phases;

modifying a voltage correction value so that the current values of the two phases are equal or two times a current in the other phase flows in one phase; and calculating the voltage error information used during the operation based on the modified voltage correction value, to store the voltage error information.

4. The control method according to claim 1, further comprising the steps:

before the operation, providing an AC motor with a current voltage instruction to drive the AC motor in a phase where currents in respective phases of the power semiconductor device constituting the voltage source inverter fall under a predetermined condition;

modifying a voltage correction value so that current values fall under the predetermined condition; and calculating the voltage error information used during the operation based on the modified voltage correction value, to store the voltage error information.

5. The control method according to claim 1, wherein any one of the conditions and methods according to one of claims 2 to 4 is performed multiple times in different phases, and the voltage error information used during the operation is calculated and stored.

* * * * *